June 9, 1959 C. K. KATON 2,890,122
MOLD AND PACKAGE FOR FROZEN CONFECTIONS
Filed Feb. 13, 1956
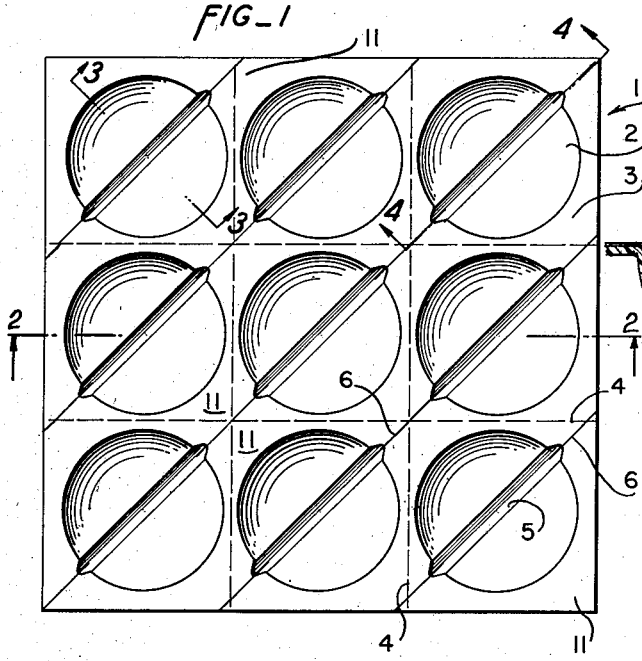
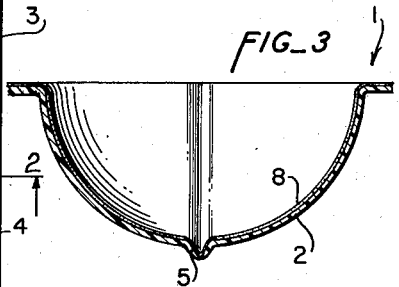
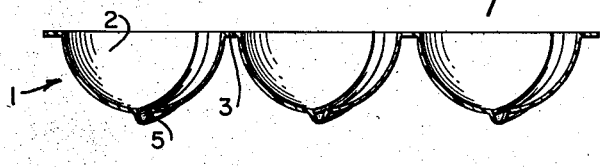
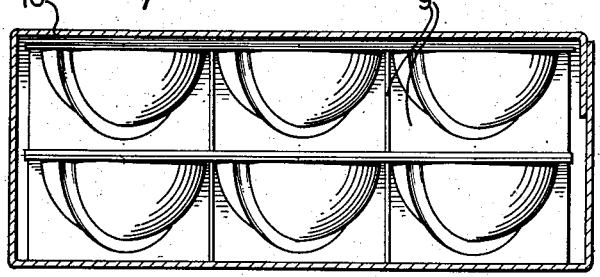
INVENTOR.
CHRIS K. KATON
BY
ATTORNEYS United States Patent Office 2,890,122
Patented June 9, 1959

2,890,122

MOLD AND PACKAGE FOR FROZEN CONFECTIONS

Chris K. Katon, San Francisco, Calif.

Application February 13, 1956, Serial No. 565,077

9 Claims. (Cl. 99—180)

This invention relates to a combined mold and package for a frozen confection such as ice cream and the like and has for one of its objects the provision of a mold and package that is formed from a single sheet of plastic material to provide recesses adapted to form ice cream deposited therein into bodies of uniform shape and size and to carry such bodies as a unit therewith to the ultimate consumer for removal of the bodies from the molds, and which molds are easily and quickly removed from said bodies without mutilating the latter.

Ice cream, sherbet and the like have been packaged in brick form for many years, the bricks being enclosed in cartons or wrapped, and the user has been compelled to unwrap the bricks and to then cut them into individual servings or to remove the ice cream from the cartons before use by first unlocking the latter and then unfolding the carton or scooping it out.

In public places where ice cream and sherbet is being sold, it is usually provided in bulk containers from which it is scooped by a hemispherical scoop. Each scoop may or may not be filled when used to serve a customer or when used for preparing a beverage or a special combination, or the scoop may be over-filled, with the result that one customer receives more than a normal serving and another less, and the beverages or special combinations made are not uniform. Also, where individual servings are scooped from a bulk container, the density of the ice cream or sherbet becomes progressively greater as it is removed, with the result that the actual weight of ice cream or sherbet in the scoops becomes greater toward the bottom of the container and the store incurs a loss of many scoops.

It has also long been established that a hemispherical form for an individual serving of ice cream, particularly when used alone in a dish and as a sundae or on food such as pie, etc. in which the dome side is directed upwardly, is the ideal shape. This is true only if the flattened side actually is flat, since the ice cream can more easily and more safely be cut from the rounded upper side. However, while the rounded or hemispherical side of each serving is readily shaped by a scoop, the opposite side is practically never flat, nor level, with the result that the serving is not stable during the time it is being eaten; and, it frequently rolls off the food or plate or, at the least, will roll around. Obviously, rectangular or square servings, while flat on a supporting side, do not have the desired rounded upper side.

With the present invention, the confection such as ice cream or sherbet or the like is in individual servings of uniform size and density and is hemispherical with a flat side for positively supporting the rounded side uppermost while it is being cut by a spoon for eating it, and said individual servings are supported in groups in which each serving is quickly separated from the others for use with the flat side exposed for being placed directly onto the desired surface without previous handling of each unit as would be required where each unit must be completely unwrapped.

An object of the present invention is the provision of ice cream, sherbet and the like packaged in a manner to be readily stored, handled and shipped in individual servings that are quickly and easily deposited in conventional containers employed for preparing milk shakes, ice cream sodas and the like, or for depositing in dishes or on food without mutilating the form in which each serving is shaped and which servings are uniform in shape, size and density and are so formed as to provide hemispherical units each with an even, flat side adapted to securely and neatly support each unit on a supporting surface while it is being eaten.

A still further object of the invention is the provision of an improved package for individual servings of ice cream, sherbet and the like in which the servings are adapted and suspended in forms that enable free circulation of the air around each form to enable uniform and rapid cooling of the ice cream servings and their uniform maintenance in a refrigerated atmosphere.

While there have been attempts to make supports for premolded food bodies that generally conform to the shapes of said bodies, such a procedure requires the premolding step since the supports themselves usually are inadequate to form the mold in that they sag out of shape when filled with a moldable food product.

Other efforts involve the use of molded wax compositions for the containers, but such containers lack the resiliency required to support the food bodies and they are difficult to remove from such bodies without breaking into pieces and without mutilating the food bodies carried therein. Also, such containers are relatively thick walled and are not capable of being economically used where fast hardening of the ice cream after it is in the container is essential.

The problem of removing the form or mold-carrier from the ice cream is one that is solved by the present invention and at the same time the problem of reinforcing the mold carrier so that it can be very thin yet will not sag is solved.

Other objects and advantages will appear in the description and in the claims.

In the drawings,

Fig. 1 is a plan view of one of the disposable trays or carriers that is both adapted to function as a mold form and as a container for the ice cream.

Fig. 2 is a sectional view taken along the line 2—2 of Fig. 1.

Fig. 3 is an enlarged fragmentary sectional view taken along line 3—3 of Fig. 1.

Fig. 4 is an enlarged fragmentary sectional view taken along line 4—4 of Fig. 1.

Fig. 5 is a side elevation view of a pair of the trays of Fig. 1 supported in superposed relation on conventional fillers within a box, said box being in section.

In detail, each package or receptacle for ice cream and the like comprises a relatively thin planar sheet of plastic material, such as of vinyl acetate, that is formed to provide a plurality of generally hemispherical recesses 2 opening outwardly of one side of the sheet.

These recesses 2 are preferably arranged in parallel rows extending at right angles to each other. They may be made singly or all recesses may be arranged in a single row or in any other desired arrangement but in any event, each recess preferably has a planar marginal portion 3 around the open side of each recess.

In the structure illustrated, where there are a plurality of parallel rows each having a plurality of recesses in each the planar marginal portions 3 around the open sides of the recesses are integrally joined with lines of perforations or spaced slits 4 extending at right angles to each other between the parallel rows of recesses so that the rows of the recesses can quickly be detached (by bending along each line of weakness and then separating each row) from the others and then the individually recessed portions can be separated quickly from the others in the row that is so detached.

By the arrangement of perforations, as above described, each recess is disposed within a marginal portion 3 of rectangular outline.

The hemispherical wall of each recess is formed to provide a continuous generally V-shaped channel 5 (Fig. 3), the open side of which opens into the recess. This channel extends straight across the recess wall between points diametrically positioned at opposite sides of the open side of each recess. The channels in the plurality of rows of recesses all preferably extend along parallel lines each extending at an angle of 45 degrees to the lines 4 of perforations. Thus each channel 5 will extend in a direction diagonally relative to the rectangular marginal portion 3 around each recess.

The planar marginal portions 3 around the open sides of recesses 2 are formed with continuous slits 6 that are aligned with the channels 5 and that extend to approximately points 7 (Fig. 4) in the walls of each channel 5 at the opposite ends thereof. These slits extend diagonally across the rectangular marginal portions 3 and the slits in the outermost marginal portions in the sheet extend to the outermost edge of the sheet.

After the package or receptacle is formed, as shown in the drawings, the recesses are filled with soft ice cream that readily assumes the shape of the recess. The walls of the recess are quite thin, hence the channel 5 acts to stiffen it against sagging as well as to form an imperforate line of weakness as will be described. Before filling each of the recesses with ice cream, the inner surface of each recess is preferably coated with a material 8 (Fig. 3) that is repellant to adhesion of the lactic acid in the ice cream. Dimethyl polysiloxane thickened with silica is one antiadherent that is suitable, since it is easily applied and will stay on the walls of the recess without drying and is odorless, colorless, tasteless and is harmless.

Once the recesses in each sheet are filled with ice cream the filled sheets may be supported from the marginal portions 3 on any suitable fillers 9 (Fig. 5) and packed in a ventilated carton 10. The carton and ice cream, so packed, are then placed in the hardening chamber where the ice cream is hardened after which the package may be shipped, under suitable refrigeration to the restaurants, hotels, stores, etc.

A rapid and suitable method of making each package or container, as seen in Fig. 1, is to place a planar sheet over a mold having recesses of the shape of recesses 2 and channels 5. The sheet when slightly heated becomes sufficiently plastic to be drawn into the mold recesses by suction, thus forming the recesses 2 and channels 5 in the sheet and this draining step makes the walls of the recess quite thin, while leaving the marginal portions 3 relatively stiff and of greater thickness and the walls of the channels 5 are still thinner than the remainders of the walls of the recesses.

A cutter may then form the slits 6 so they will terminate within the walls of each channel at the ends of the latter. In the finished container, each rectangular marginal portion at two diametrically opposite sides of the recess will have solid, unslit corners 11 and the other two diametrically opposite corners will be slit to the edge of the marginal portion.

Once the operator has separated one recess from the rest, the ice cream therein may be quickly ejected and the container removed by the operator merely inverting the recess over the desired bowl, plate or receptacle and pulling the corners 11 oppositely away from each other. The material of the channel being thinner than that of the remainder of the recess and the other two corners being slit into the ends of said channel, the said material will very easily tear and will follow the channel.

The walls of the recess cannot, of course, be perforated and scoring would objectionably weaken the walls, but the thinning of the material of the channel and the formation of the channel not only functions to reinforce the wall of the recess but enables the wall to be easily and accurately torn apart.

I claim:

1. A mold and package for a frozen confection comprising: a single sheet of relatively thin flexible plastic material formed to provide the walls of an upwardly opening recess of predetermined shape and a planar marginal portion around the open side of said recess, a frozen confection substantially filling said recess, a continuous narrow imperforate part of said walls extending from a point adjacent to said marginal portion at one side of said recess to a point at the opposite side of said recess being of less thickness than that of the remainder of said walls, said marginal portion having a continuous cut extending thereacross and to said point whereby said sheet may be readily torn from said point along said narrow imperforate part.

2. A mold and package for a frozen confection comprising: a single sheet of relatively thin flexible plastic material formed to provide the walls of an upwardly opening recess of predetermined shape and a planar marginal portion around the open side of said recess, a frozen confection substantially filling said recess, a continuous narrow imperforate part of said walls extending from a point adjacent to said marginal portion at one side of said recess to a point at the opposite side of said recess being of less thickness than that of the remainder of said walls, said marginal portion having a continuous cut extending thereacross and to said point whereby said sheets may be readily torn from said point along said narrow imperforate part, said marginal portion being relatively stiff and of greater thickness than the thickness of said walls.

3. A mold and package for a frozen confection comprising: a single sheet of relatively thin flexible plastic material formed to provide the walls of an upwardly opening recess of predetermined shape and a planar marginal portion around the open side of said recess, a frozen confection substantially filling said recess, a continuous narrow imperforate part of said walls extending from a point adjacent to said marginal portion at one side of said recess to a point at the opposite side of said recess being of less thickness than that of the remainder of said walls, said marginal portion having a continuous cut extending thereacross and to said points, and said points being spaced from said marginal portion and within the outline of said walls.

4. A mold and package for a frozen confection comprising: a single sheet of relatively thin, flexible, plastic material formed to provide the walls of an upwardly opening hemispherical recess and a planar marginal portion around the open side of said recess, the walls of said recess being formed with a substantially V-shaped channel extending across said walls between diametrically opposite points along the open side of said recess, the thickness of the walls of said channel being less than the thickness of the remainder of the walls of said recess and said marginal portions adjacent to said opposite points being slit along longitudinally aligned lines extending into the walls defining the ends of said channel and a frozen confection substantially filling said recess including said channel.

5. A mold and package for a frozen confection comprising: a single sheet of relatively thin, flexible, plastic material formed to provide the walls of an upwardly opening hemispherical recess and a planar marginal portion around the open side of said recess, the walls of said recess being formed with a substantially V-shaped channel extending across said walls between diametrically opposite points along the open side of said recess, the thickness of the walls of said channel being less than the thickness of the remainder of the walls of said recess and said marginal portions adjacent to said opposite points being slit along longitudinally aligned lines extending into the walls defining the ends of said channel, a frozen confection substantially filling said recess including said channel, said marginal portions being of greater thickness than the walls of said recess to provide a support for suspending the recessed part of said sheet from said marginal portion.

6. A mold and package for a frozen confection comprising: a single planar sheet of relatively thin, flexible, plastic material formed to provide a plurality of equally spaced hemispherical recesses of the same size opening outwardly of one side of said sheet, said recesses being in equally spaced parallel rows with the recesses aligned along perpendicularly extending lines and a planar web of said sheet connecting the sides of adjacent recesses at their open sides defining planar marginal portions around the said open sides, said marginal portions being cut through along a set of straight parallel lines extending at angles of 45 degrees to said rows with said cuts extending a short distance into the walls of said recesses at diametrically opposite points along their open sides, and the walls of each of said recesses being formed to provide a generally V-shaped channel extending between the said points, the walls of each of said channels being of less thickness than that of the remainders of the walls of said recesses and a frozen confection substantially filling each of said recesses including the channel therein.

7. A mold and package for a frozen confection comprising: a single planar sheet of relatively thin, flexible, plastic material formed to provide a plurality of equally spaced hemispherical recesses of the same size opening outwardly of one side of said sheet, said recesses being in equally spaced parallel rows with the recesses aligned along perpendicularly extending lines and a planar web of said sheet connecting the sides of adjacent recesses at their open sides defining planar marginal portions around the said open sides, said marginal portions being cut through along a set of straight parallel lines extending at angles of 45 degrees to said rows with said cuts extending a short distance into the walls of said recesses at diametrically opposite points along their open sides, and the walls of each of said recesses being formed to provide a generally V-shaped channel extending between the said points, the walls of each of said channels being of less thickness than that of the remainders of the walls of said recesses, and the said marginal portions being of greater thickness than the walls of said recesses and a frozen confection substantially filling each of said recesses including the channel therein.

8. A package comprising a plurality of hemispherical mold forms having thin walls of flexible plastic material defining hemispherical recesses, and a planar web connecting said forms along the open sides of said recesses, the hemispherical walls of each of said forms being formed with a single substantially V-shaped channel having its open side opening into each hemispherical recess, said forms being arranged in parallel rows extending at right angles to each other and said channels extending in the same direction along parallel lines extending at angles of 45 degrees to the said rows, slits along said parallel lines aligned therewith and formed in said web extending into the walls of said channels at the ends of the latter, a frozen confection in each of said recesses filling each of said channels.

9. A package comprising a plurality of hemispherical mold forms having thin walls of flexible, plastic material defining hemispherical recesses, and a planar web connecting said forms along the open sides of said recesses, the hemispherical walls of each of said forms being formed with a single substantially V-shaped channel having its open side opening into each hemispherical recess, said forms being arranged in parallel rows extending at right angles to each other and said channels extending in the same direction along parallel lines extending at angles of 45 degrees to the said rows, slits along said parallel lines aligned therewith and formed in said web extending into the walls of said channels at the ends of the latter, ice cream in each of said recesses filling each of said channels, and a thin coating of material resistant to adhesion by the lactic acid in said ice cream on the walls of said recesses and between said body of ice cream and said walls.

References Cited in the file of this patent

UNITED STATES PATENTS

| | | |
|---|---|---|
| 545,567 | Baker | Sept. 3, 1895 |
| 2,103,389 | Salfisberg | Dec. 28, 1937 |
| 2,120,640 | Craemer | June 14, 1938 |
| 2,248,266 | Abrams | July 8, 1941 |
| 2,698,248 | Peters | Dec. 28, 1954 |
| 2,736,656 | Marshall | Feb. 28, 1956 |